(12) United States Patent
Zhou

(10) Patent No.: US 12,245,061 B2
(45) Date of Patent: Mar. 4, 2025

(54) NETWORK ACCESS DEVICE AND METHOD FOR THE SAME, MEDIUM AND COMPUTER PROGRAM PRODUCT

(71) Applicant: ARRIS Enterprises LLC, Suwanee, GA (US)

(72) Inventor: Huiqi Zhou, Shenzhen (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 435 days.

(21) Appl. No.: 17/665,872

(22) Filed: Feb. 7, 2022

(65) Prior Publication Data
US 2022/0256378 A1 Aug. 11, 2022

(30) Foreign Application Priority Data
Feb. 7, 2021 (CN) .......................... 202110177136.X

(51) Int. Cl.
*H04W 24/08* (2009.01)
*H04W 64/00* (2009.01)

(52) U.S. Cl.
CPC .......... *H04W 24/08* (2013.01); *H04W 64/00* (2013.01)

(58) Field of Classification Search
CPC .... H04W 24/08; H04W 64/00; H04L 5/0048; H04L 5/0058; H04L 25/0222; H04L 25/0224; H04L 25/0204; H04B 7/0452; H04B 7/0626
See application file for complete search history.

(56) References Cited

U.S. PATENT DOCUMENTS

| | | | |
|---|---|---|---|
| 9,992,789 B1* | 6/2018 | Lin | H04L 5/0048 |
| 2011/0288480 A1* | 11/2011 | Bedingfield | A61M 1/282 |
| | | | 604/114 |
| 2011/0299480 A1 | 12/2011 | Breit et al. | |
| 2015/0208265 A1 | 7/2015 | Dalsgaard et al. | |
| 2016/0036572 A1* | 2/2016 | Bhanage | H04B 7/0626 |
| | | | 370/329 |
| 2021/0007095 A1* | 1/2021 | Eldessoki | H04L 5/0048 |

OTHER PUBLICATIONS

International Search Report and the Written Opinion of the International Searching Authority dated Jun. 3, 2022 in International (PCT) Application No. PCT/US2022/015441.
International Preliminary Report on Patentability and Written Opinion issued Aug. 17, 2023 in International Application No. PCT/US2022/015441.

* cited by examiner

*Primary Examiner* — Dady Chery
(74) *Attorney, Agent, or Firm* — Wenderoth, Lind & Ponack, L.L.P.

(57) ABSTRACT

The present disclosure relates to a network access device and method for the same, medium and program product. A network access device, comprising: a memory storing instructions; and a processor executing at least the following operations: monitoring changes in channel state between user equipment and a network access device; storing and updating the list of static user equipment from the user equipment, wherein a monitored change in a channel state during a first time period is smaller than a first threshold; grouping two or more user equipment in the list of static user equipment into at least one first sounding group based on sounding grouping criteria; and performing channel sounding, in the absence of the list of static user equipment, for the at least one first sounding group at a second channel sounding frequency lower than a first channel sounding frequency.

19 Claims, 4 Drawing Sheets

NETWORK ACCESS DEVICE AND METHOD FOR THE SAME, MEDIUM AND COMPUTER PROGRAM PRODUCT

TECHNICAL FIELD

The present disclosure relates to a network access device, particularly relating to channel sounding of User Equipment (UE) by the network access device.

BACKGROUND ART

Multi-User Multiple-Input Multiple-Output (MU-MIMO) technology is a type of spatial multiplexing in which network access devices (for example, base stations or access points) use the same time-frequency resources for a plurality of parallel transmissions with a plurality of users. Compared to Single-User Multiple-Input Multiple-Output (SU-MIMO), MU-MIMO is able to reduce latency and increase data transmission rate and network throughput in multi-user access network systems, and has become a key feature in systems such as LTE and IEEE 802.11ac 2.0 (Wi-Fi 6).

In a MU-MIMO system, the network access device simultaneously sends a plurality of data streams for a plurality of users via a plurality of antennas into the wireless space. Accordingly, each user receives a superposition of the signal and interference noise sent by the network access device to all users. In order to eliminate this multiple access interference, the network access device needs to carry out estimation of the channels of a plurality of users, obtain Channel State Information (CSI), and pre-process the sent signals based on the channel state information to make the signals received by a plurality of users orthogonal to each other. In MU-MIMO systems, channel estimation, also known as channel sounding or channel measurement, is completed by the network access device, as the user equipment of each user are independent of each other, and it is generally difficult to obtain the channel information of other users.

SUMMARY OF THE INVENTION

The MU-MIMO system is highly sensitive to changes in channel state. Once the CSI used by the user access device in pre-processing sent signals that do not precisely match the channel, the data stream for other users will become interference superposed on the target user's data stream, resulting in serious interference to the target user. Therefore, the network access device often needs to update the CSI in a timely manner at a relatively high channel sounding frequency. This results in large airtime overhead.

Moreover, the channel sounding frequency of the network access device for each user in current MU-MIMO systems is the same and constant over time, which further reduces the performance of the overall system.

Regarding the above problem, simply reducing the channel sounding frequency of the entire system would increase the risk of inaccurate CSI, which would bring about more interference and deteriorate the system performance.

The present disclosure is dedicated to solving one or more of the above problems. The present disclosure provides a network access device and method for the same, medium and computer program product, which can determine whether a user equipment is static based on changes in the channel state of the user equipment, and reduce the channel sounding frequency for a group of static user equipment relative to non-static user equipment where channel sounding can be performed simultaneously for this group of a plurality of static user equipment. As such, the present disclosure is able to save airtime overhead effectively while avoiding CSI inaccuracies, thus improving system performance. Furthermore, the identification of static user equipment is performed in real time, allowing the channel sounding frequency to change with different user equipment and over time, thus guaranteeing improved system performance at any given time.

According to a first aspect of the present disclosure, a network access device is provided. The network access device comprises: a memory, in which instructions are stored; and a processor, configured to execute the instructions stored in the memory to cause the electronic device to execute at least the following operations: monitoring changes in channel state between each user equipment among a plurality of user equipment and a network access device; updating the list of static user equipment, in which the list of static user equipment comprises user equipment, among the plurality of user equipment, between which and the network access device a monitored change in channel state during a first time period is smaller than a first threshold; grouping two or more user equipment in the list of static user equipment into at least one first sounding group based on sounding grouping criteria; and performing channel sounding on user equipment in of the at least one first sounding group at a second channel sounding frequency lower than a first channel sounding frequency at which channel sounding on the plurality of user equipment is performed in the absence of the list of static user equipment.

In some embodiments, the operation of monitoring changes in the channel state between each user equipment and the network access device comprises: monitoring changes in the location of each user equipment.

In some embodiments, the operation of monitoring changes in the channel state between each user equipment and the network access device comprises: monitoring fluctuations in the Received Signal Strength Indication (RSSI) of signals received from each user equipment.

In some embodiments, the operation of updating the list of static user equipment comprises: adding the first user equipment to the list of static user equipment in response to the first user equipment among a plurality of user equipment being determined to have changes in the channel state between the first user equipment and the network access device smaller than the first threshold during the first time period.

In some embodiments, the operation of updating the list of static user equipment comprises: moving the second user equipment out of the list of static user equipment in response to the second user equipment among a plurality of user equipment being determined to have changes in channel state between the second user equipment and the network access device no smaller than the second threshold during the second time period, in which the second threshold is no lower than the first threshold.

In some embodiments, the sounding grouping criteria comprises a requirement that user equipment grouped into the same sounding group must meet at least one of the following: same operating bandwidth; same RSSI; and sufficient angular separation.

In some embodiments, the processor is further configured to execute the instructions stored on the memory to cause the network access device to execute at least the following operations: performing channel sounding on a plurality of user equipment that are not in the list of static user equipment at the first channel sounding frequency.

In some embodiments, the processor is further configured to execute the instructions stored on the memory to cause the network access device to execute at least the following operations: performing channel sounding on user equipment in the list of static user equipment that are not in the at least one first sounding group at the second channel sounding frequency.

In some embodiments, the processor is further configured to execute the instructions stored on the memory to cause the network access device to execute at least the following operations: performing channel sounding on the second sounding group at the first channel sounding frequency, in response to the determination that a user equipment in the list of static user equipment cannot be grouped into the same sounding group as any other user equipment in the list of static user equipment based on the sounding grouping criteria, but can be grouped into a second sounding group with a user equipment among the plurality of user equipment that are not in the list of static user equipment.

According to a second aspect of the present disclosure, a method for a network access device is provided. The method may comprise: monitoring changes in channel state between each user equipment among a plurality of user equipment and a network access device; updating the list of static user equipment, in which the list of static user equipment comprises user equipment, among the plurality of user equipment, between which and the network access device, a monitored change in channel state during a first time period is smaller than a first threshold; grouping two or more user equipment in the list of static user equipment into at least one first sounding group based on sounding grouping criteria; and performing channel sounding on user equipment in the at least one first sounding group at a second channel sounding frequency lower than a first channel sounding frequency at which channel sounding on the plurality of user equipment is performed in the absence of the list of static user equipment.

In some embodiments, monitoring changes in the channel state between each user equipment and the network access device comprises: monitoring fluctuations in the Received Signal Strength Indication (RSSI) of signals received from each user equipment.

In some embodiments, updating the list of static user equipment comprises: adding the first user equipment to the list of static user equipment in response to the first user equipment among a plurality of user equipment being determined to have changes in the channel state between the first user equipment and the network access device smaller than the first threshold during the first time period.

In some embodiments, updating the list of static user equipment comprises: moving the second user equipment out of the list of static user equipment in response to the second user equipment among a plurality of user equipment being determined to have changes in channel state between the second user equipment and the network access device no smaller than the second threshold during the second time period, in which the second threshold is no lower than the first threshold.

In some embodiments, the sounding grouping criteria comprises a requirement that user equipment grouped into the same sounding group must meet at least one of the following: same operating bandwidth; same RSSI; and sufficient angular separation.

In some embodiments, the method also comprises: performing channel sounding on user equipment in the list of static user equipment that are not in the at least one first sounding group at the second channel sounding frequency.

In some embodiments, the method also comprises: performing channel sounding on the second sounding group at the first channel sounding frequency, in response to the determination that a user equipment in the list of static user equipment cannot be grouped into the same sounding group as any other user equipment in the list of static user equipment based on the sounding grouping criteria, but can be grouped into a second sounding group with a user equipment among the plurality of user equipment that are not in the list of static user equipment.

According to a third aspect of the present disclosure, a non-transitory computer-readable medium to be used together with a processor of a network access device is provided. The non-transitory computer-readable medium has instructions stored therein, and the instructions execute at least the method mentioned in the second aspect when executed by the processor.

According to a fourth aspect of the present disclosure, a computer program product, comprising computer instructions, is provided, wherein the computer instructions implement the method mentioned in the second aspect when executed by a processor of a network access device.

BRIEF DESCRIPTION OF THE ATTACHED DRAWINGS

For a better understanding of the present disclosure and to show how to realize the present disclosure, examples are herein described with reference to the attached drawings, wherein.

It should be noted that throughout the attached drawings, similar reference numerals and signs refer to corresponding parts.

SPECIFIC EMBODIMENTS

The following detailed description is made with reference to the attached drawings, and the following detailed description is provided to facilitate comprehensive understanding of various exemplary embodiments of the present disclosure. The following description includes various details for facilitation of understanding. However, these details are merely considered as examples, not for limiting the present disclosure. The present disclosure is defined by the attached claims and their equivalents. The words and phrases used in the following description are only used to enable a clear and consistent understanding of the present disclosure. In the present disclosure, limitations such as "first" and "second" are only for the ease of differentiation and unless otherwise specified, do not represent the sequence between the described elements. In addition, for clarity and brevity, descriptions of well-known structures, functions, and configurations may be omitted. Those of ordinary skill in the art would realize that various changes and modifications can be made to the examples described in the present specification without departing from the gist and scope of the present disclosure.

Figure 1:
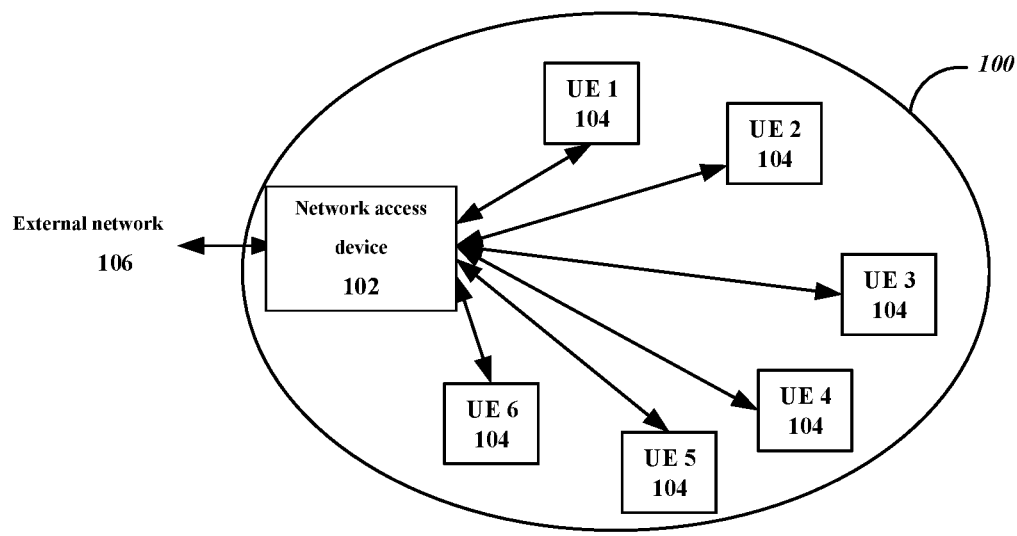
FIG. 1 is a schematic diagram showing a wireless network according to an embodiment of the present disclosure.

FIG. 1 is a schematic diagram showing a wireless network 100 according to an embodiment of the present disclosure. The wireless network 100 may comprise a network access device 102 and user equipment 104. The quantity of the network access device 102 and user equipment 104 may be any of one or a plurality, and is not limited to the quantity shown in FIG. 1. The network access device 102 provides wireless network access to the user equipment 104. In some embodiments, the network access device 102 may use 5G NR, LTE, LTE-A, WiMax, such as IEEE 802.11 Wi-Fi wireless local area network (WLAN), LTE-U (LAA) Device-to-Device (D2D) and Vehicle-to-Everything (V2X), or other wireless communication technologies to communicate with the user equipment 104. Optionally, in some embodiments, the network access device 104 may also be connected to one or more external networks 106 via wired or wireless methods, so that the user equipment 104 is able to communicate with the external network 106 through the network access device 102. For example, the external network 106 may be a wide area network (WAN) (such as Internet or private IP network) or mobile communication core network.

The network access device 102 is configured to be able to simultaneously transmit data to a plurality of user equipment 104 by using the same time-frequency resources. For example, the network access device 102 may be a device that enables MU-MIMO. At this point, the network access device 102 may be an antenna array comprising a plurality of antennas and is able to generate a plurality of beams that are spatially orthogonal to each other based on the channel sounding of a plurality of users, so as to simultaneously transmit them to this plurality of users. In order to implement this, the network access device 102 needs to perform channel sounding on a plurality of user equipment and the embodiments of the present disclosure are provided for this process.

Depending on the type of wireless network 100, the network access device 102 and user equipment 104 may be specifically embodied into different entities with different names. For example, the network access device 102 can be referred to as base station, eNodeB, management entity, management network entity, access point, and wireless router, etc., while the user equipment or UE 104 may be referred to as mobile station, subscriber station, remote terminal, wireless terminal, and user device, etc. under different network types. For convenience, in the present disclosure, "User Equipment" or "UE" (the two may be used interchangeably) is used to represent various remote wireless equipment that can wirelessly access the wireless network 100 provided by the network access device 102, including various mobile devices (such as mobile phones, portable computers, portable smart devices, vehicle terminals, etc.) and fixed devices (such as desktop computers and smart appliances, etc.).

Figure 2:
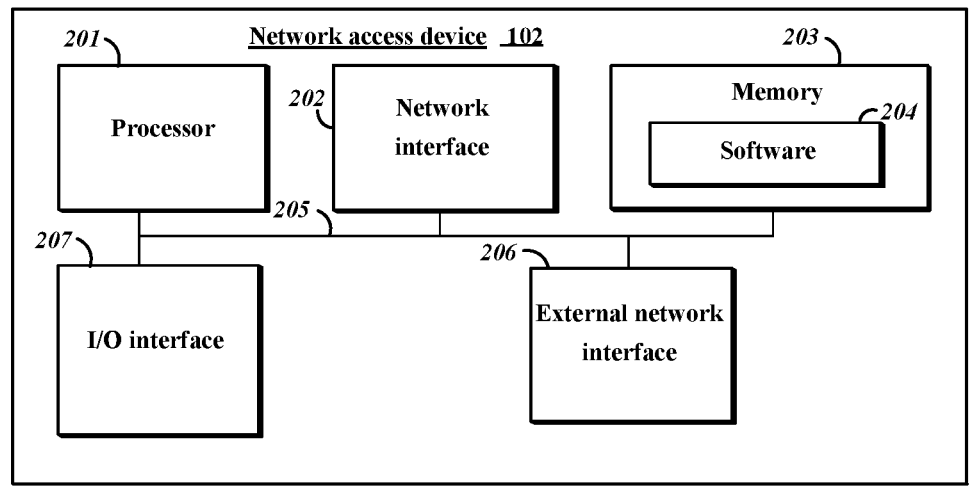
FIG. 2 is a block diagram showing a configuration of the network access device according to an embodiment of the present disclosure.

FIG. 2 is a block diagram showing a configuration of the network access device 102 according to an embodiment of the present disclosure. The network access device 102 is able to provide a plurality of UE with network access to any type of device, such as wireless gateway, wireless router, access point, hotspot, base station or eNodeB. As shown in FIG. 2, the electronic device 102 comprises a processor 201, a network interface 202, a memory 203, and a bus 205.

The processor 201 controls general operations of the network access device 102. The processor 201 may include, but is not limited to, a CPU, a hardware microprocessor, a hardware processor, a multi-core processor, a single-core processor, a microcontroller, an application-specific integrated circuit (ASIC), a DSP, or other similar processing devices, which can execute any type of instructions, algorithms, or software for controlling the operations and functions of the network access device 102 according to the embodiments described in the present disclosure. The processor 201 may be various implementations of a digital circuit system, an analog circuit system, or a mixed signal (combination of analog and digital) circuit system that executes functions in a computing system. The processor 201 may include, for example, an integrated circuit (IC), a part or circuit of a separate processor core, an entire processor core, an individual processor, a programmable hardware device such as a field programmable gate array (FPGA), and/or a system comprising a plurality of processors.

The network interface 202 may comprise a circuit system implemented by software and/or hardware, to facilitate the provision of network access to UE based on a wireless protocol. The wireless protocol is, for example, any IEEE 802.11 Wi-Fi protocol, short-distance communication protocols (including Bluetooth protocol, Bluetooth Low Energy (BLE), RF4CE protocol, ZigBee protocol, Z-Wave protocol, or IEEE 802.15.4 protocol, etc.) for exchanging data over short distances in any licensed or unlicensed frequency band (for example, the Citizen Broadband Radio Service (CBRS) band, 2.4 GHz band, 5 GHz band, 6 GHz band, or 60 GHz band) in accordance with wireless technology standards, or cellular network communication protocols (for example, GSM, CDMA 2000, UMTS (WCDMA), LTE, LTE-Advanced (LTE-A), LAA/LTE-U, 5G NR, etc.). In some embodiments, the network interface 202 may comprise one or more antennas (not shown) or a circuit node to be coupled to one or more antennas.

The memory 203 comprises one or more memories or memory locations, including but not limited to a random access memory (RAM), dynamic random access memory (DRAM), static random access memory (SRAM), read-only memory (ROM), EPROM, EEPROM, flash memory, FPGA logic block, hard disk, or any other layers of a memory hierarchy. The memory 203 may be used to store any type of instructions, software or algorithms, including software 204 for controlling general functions and operations of the network access device 102.

The internal bus 205 may be used to establish communication between the components (for example, 201-207) of the network access device 102.

In some embodiments, the network access device 102 may further comprise an external network interface 206. The external network interface 206 may comprise a circuit system implemented by software and/or hardware, so that the network access device 102 is able to access various external networks (such as WAN or mobile communication core network).

In some embodiments, the network access device 102 may further comprise an I/O interface 207. The I/O interface 207 is a collection of components that can receive input from the user and/or provide output to the user. The I/O interface 207 may include, but is not limited to, buttons, keyboards, keypads, LCD, CRT, TFT, LED, HD, or other similar display devices, including display devices with touch screen capability to enable interaction between users and electronic devices.

Although specific components are used to describe the network access device 102, in alternative embodiments, different components may exist in the network access device 102. For example, the network access device 102 may comprise one or more additional processors, memories, network interfaces and/or I/O interfaces. In addition, one or more of the components may not exist in the network access device 102. Moreover, in some embodiments, the network access device 102 may comprise one or more components not shown in FIG. 2. In addition, although separate components are shown in FIG. 2, in some embodiments, some or all of the given components may be integrated into one or more of the other components in the network access device 102. Moreover, any combination of analog and/or digital circuits may be used to implement the circuit and components in the network access device 102.

Figure 3:
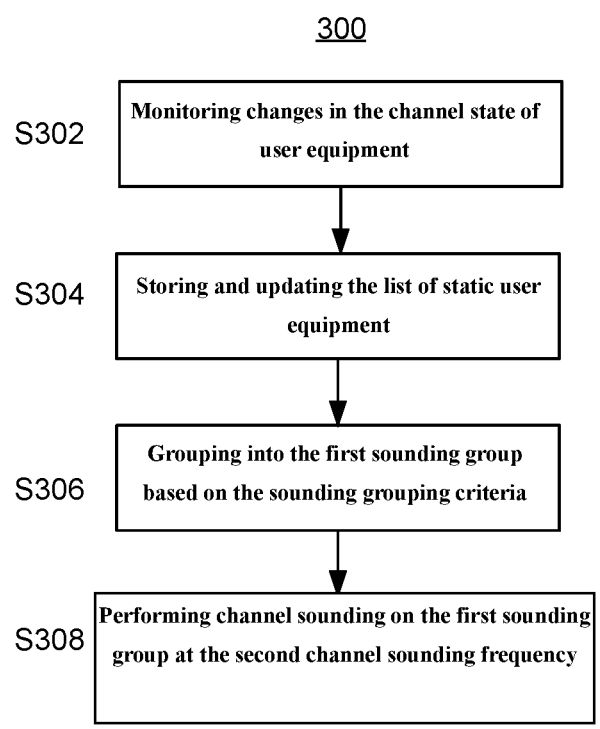
FIG. 3 is an exemplary flow chart showing the method used for the network access device according to an embodiment of the present disclosure.

FIG. 3 is an exemplary flow chart showing the method 300 used for the network access device according to an embodiment of the present disclosure. For example, this method 300 can be implemented through the network access device 102 described in FIG. 2, in which, the various steps of the method 300 can, for example, be implemented via the processor 201 of the network access device 102.

As shown in FIG. 3, in Step S302, changes in the channel state between each UE among a plurality of UE and the network access device is monitored.

Changes in the channel state of the communication channel between the network access device and the UE can determine changes in the location of the UE to a very large extent, particularly since the network access device is generally fixed. In some embodiments, monitoring changes in the channel state of each UE can comprise directly monitoring changes in the location of the UE. For example, the network access device can determine whether there are changes to the location of the UE through existing or additional ranging. Another example is that the network access device can obtain location parameters (such as those obtained based on the location estimated by the global navigation satellite system [GNSS]) corresponding to the UE, thereby determining whether there are changes to the location of the UE.

In another embodiment, monitoring the changes in the channel state of each UE can comprise monitoring fluctuations in the Received Signal Strength Indication (RSSI) of signals received from the UE. RSSI is related to the distance between the network access device and the UE. If the UE moves, for example, away from the network access device, the RSSI received from this UE will become smaller, but if the UE moves closer to the network access device, RSSI will become larger. RSSI fluctuations can also reflect changes in channel state due to factors other than changes in UE distance. For example, if an occluder appears between the moved UE and the network access device, causing the channel attenuation to increase, RSSI will also change.

Next, in Step S304, the list of static UE is stored and updated, in which, the list of static UE may comprise UE, among a plurality of UE, between which and the network access device a monitored change in channel state during a first time period is smaller than a first threshold. By continuously executing monitoring in Step S302 in the first time period, the network access device is able to find UE among all the UE connected to this network access device in which changes in the channel state are smaller than the first threshold, and identify these UE's as static UE. It should be noted that in the present disclosure, "static" does not mean that the channel state of this UE must remain absolutely unchanged but it means that the changes may be smaller than other UE. UE in the list of static UE have smaller changes in the channel state as compared to other UE that are not in this list.

The network access device may store the list of static UE in the local memories (e.g. memory 203 as shown in FIG. 2) or remote memories. In some embodiments, the stored list of static UE is a data structure that physically exists and can be stored in the form of a list. In other embodiments, the list of static UE may simply label the identified static UE to facilitate the retrieving by the network access device, without the need to truly generate a data structure in the form of a list.

Updating the list of static UE may comprise: adding the first UE to the list of static UE in response to the first UE among a plurality of UE being determined to have changes in channel state between the first UE and the network access device smaller than the first threshold during the first time period. The duration of the first time period and the first threshold may be designed flexibly based on the actual situation. When monitoring changes in the channel state by monitoring RSSI fluctuations, in some embodiments, the first threshold may be set as a value between 0.1 dB and 3 dB. In some embodiments, the first threshold may be set as 2 dB. In some embodiments, the duration of the first time period may be set as a value between 1 minute and 10 minutes. In some embodiments, the duration of the first time period may be set as 5 minutes.

Updating the list of static UEs may further comprise: moving the second UE out of the list of static UE in response to the second UE among a plurality of UE being determined to have changes in channel state between the second UE and the network access device no smaller than the second threshold during the second time period.

The duration of the second time period and the second threshold may similarly be designed flexibly based on the actual situation. In some embodiments, the remove-from-list criteria may be consistent with the add-to-list criteria, that is, the duration of the second time period is the same as that of the first time period, and the second threshold is equivalent to the first threshold. In other embodiments, the remove-from-list criteria may be different from the add-to-list criteria. For example, in some cases, the second threshold may be set to be larger than the first threshold. This can, to a certain degree, prevent management overhead brought by frequent sounding grouping changes from overly frequent changes in the list of static UE (as will be introduced hereinafter). When monitoring changes in the channel state by monitoring RSSI fluctuations, in some embodiments, the second threshold may be set as a value between 3 dB and 8 dB. In some embodiments, the second threshold may be set as 4 dB. In some embodiments, the duration of the second time period may be set as a value between 1 minute and 10 minutes. In some embodiments, the duration of the second time period may be set as 5 minutes.

In some embodiments, the network access device may repeat the execution of Steps S302 and S304 at every predetermined interval or every time a signal is received from the UE to update the list of static UE in real time.

Next, in Step S306, two or more UE in the list of static UE are grouped into at least one first sounding group based on the sounding grouping criteria. The network access device is able to simultaneously send a plurality of transmission beams to a plurality of UE in the same sounding group, so that every beam is pointed towards the corresponding target UE in the sounding group, while the null controlling the beam is pointed to other UE in this sounding group. In some embodiments, the sounding grouping criteria requires UE grouped, or divided, into the same sounding group to have at least one of the same operating bandwidth, the same RSSI and sufficient angular separation. Having sufficient angular separation between two UEs refers to the null being aligned to another UE when the angle of two UE relative to the network access device is large enough to allow the directional beam of the network access device to aim at one of the UE. The minimum angular difference allowed between two UE is related to the beam angular resolution obtained from beamforming performed by the network access device using the MIMO antenna array, while the beam angular resolution is further related to the size of the MIMO antenna array.

Next, in Step S308, channel sounding is performed on the UE in the at least one first sounding group at a second channel sounding frequency lower than a first channel sounding frequency at which channel sounding on the plurality of UEs are performed in the absence of the list of static UE.

The communication between the network access device and a plurality of UE is carried out based on the transmission cycle. Each transmission cycle may comprise a starting channel sounding time period and subsequent data transmission time periods. If the network access device needs to simultaneously perform a plurality of data transmissions on a plurality of UE using the same time-frequency resources in the data transmission time period, channel sounding must be performed on this plurality of UE in the channel sounding time period. The channel sounding performed by the network access device on each UE is performed in cycles and the inverse of this cycle is the frequency of channel sounding on this UE.

Situations where the list of static UE is absent may comprise not generating the list of static UE. For example, in prior art before the present disclosure, the network access device performing channel sounding directly on the UEs without identifying any static UE and thus without generating the list of static UE. As mentioned above, in prior art, the network access device uses the same fixed frequency to perform channel sounding on each of the UEs. The first channel sounding frequency may comprise this fixed frequency. As will be introduced below, in some embodiments, situations where the list of static UE is absent may further comprise the list of static UE being void, which occurs during dynamically updating of the list of static UE, that is, no static UEs are discovered after the identification. If no static UEs are identified, channel sounding shall be performed on each of the UEs at the same first channel sounding frequency. In some embodiments, the first channel sounding frequency may be 5 times-10 times per second.

Channel sounding is the process where the network access device works together with UE to measure channels, so as to obtain the channel state information CSI. The channel state information CSI can describe the effect of the channel on transmission performed thereon. Channel sounding may comprise the network access device sending a sounding symbol (such as a Null Data Packet (NDP) specified in IEEE 802.11ac) comprising a training field to the UE, the UE analyzing and calculating the CSI after receiving the sounding symbol, and returning the CSI in the form of a feedback matrix (such as matrix V specified in IEEE 802.11ac) to the network access device. The network access device is able to perform sounding on the channel of only one UE in one channel sounding, and it may also simultaneously perform sounding on a plurality of channels corresponding to a plurality of UE. After the network access device receives one or more required feedback matrices, it calculates the beam steering matrix (such as matrix Q specified in IEEE 802.11ac). In subsequent data transmissions, the network access device uses the steering matrix obtained this way for beamforming, so as to obtain a plurality of directional beams for simultaneous transmission.

In some embodiments, the second channel sounding frequency may be one-Nth (N is an integer greater than 1) of the first channel sounding frequency. In some embodiments, the second channel sounding frequency may be ¼ to ½ of the first channel sounding frequency.

The frequency of channel sounding on each UE in the same first sounding group is the same. The channel sounding frequency of the various sounding groups among a plurality of the first sounding groups in the list of static UE may be the same, and may also be different, but in both cases, it is lower than the first channel sounding frequency.

In some embodiments, Steps S302 and S304 may be more frequently executed than Steps S306 and S308, so that they are based on the latest list of static UE during each sounding grouping.

According to the embodiments of the present disclosure, the network access device identifies static UE, divides static UE into the same sounding group, and reduces the channel sounding frequency of this sounding group. In this way, it saves unnecessary airtime consumption by the original frequent channel sounding on static UE, increasing the throughput of the system.

Figure 4:
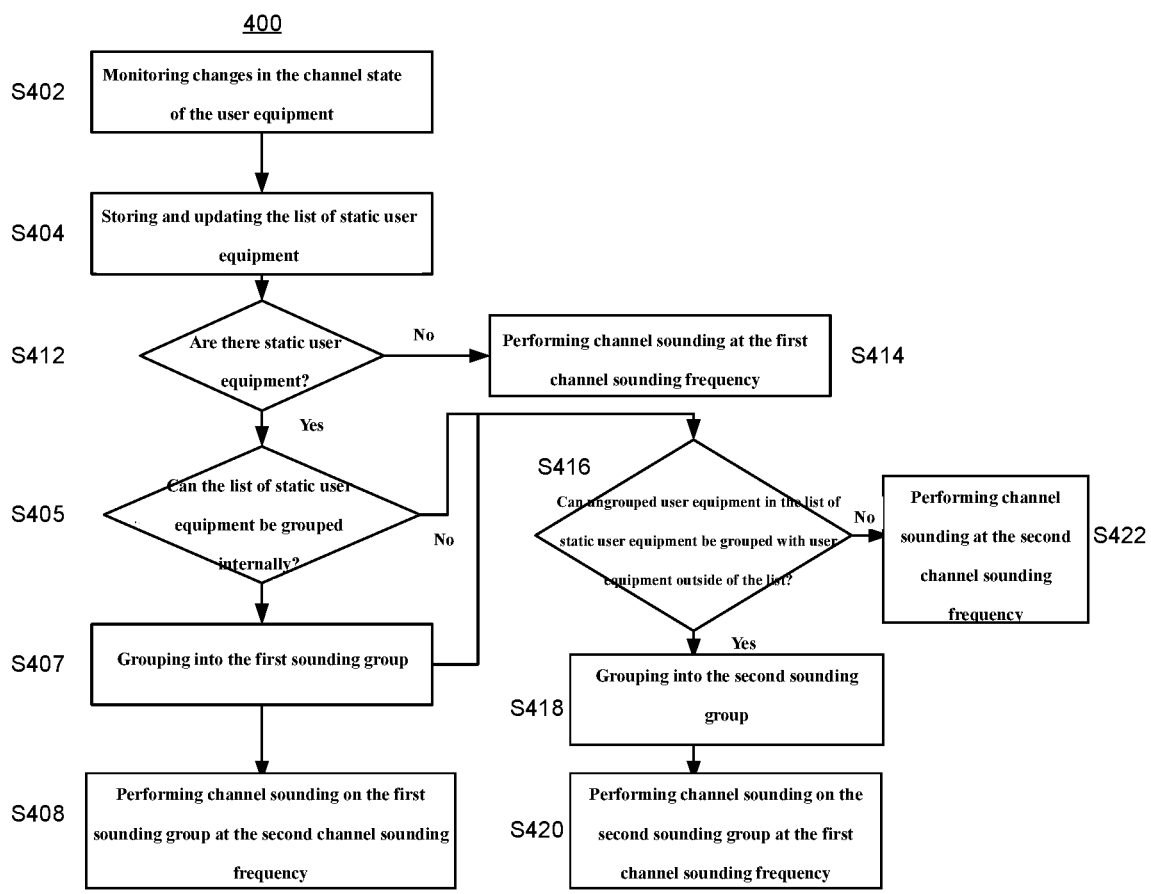
FIG. 4 is an exemplary flow chart showing the method used for the network access device according to an embodiment of the present disclosure.

FIG. 4 is an exemplary flow chart showing the method 400 used for the network access device according to an embodiment of the present disclosure. The method 400 can be deemed as an extension of the method 300 of FIG. 3, in which, Steps S402, S404, and S408 are different from Steps S302, S304, and S308 described above with reference to FIG. 3, respectively, so this will not be repeated here. Differences between method 400 and method 300 are introduced below.

Method 400 further divides Step S306 in method 300 into Steps S405 and S407. In Step S405, whether the list of static UE can be grouped into the at least one first sounding group is determined based on the sounding grouping criteria. Next, in Step S407, the at least one first sounding group is grouped in response to the determination that grouping is possible.

If grouping of the list of static UE is determined to not be possible in Step S405, that is, any UE in the list cannot be grouped into a sounding group with other UE in the list, proceed to Step S416, where whether each UE in the list of static UE can be grouped into the same sounding group as a UE among a plurality of UE outside of the list is determined based on the sounding grouping criteria.

If it is determined in Step S416 that the UE in the list of static UE also cannot be grouped into the same sounding group as a UE outside of the list, channel sounding is performed on this UE using a second channel sounding frequency lower than the first channel sounding frequency in Step S422.

If it is determined in Step S416 that the UE in the list of static UE can be grouped into the same sounding group as a UE outside of the list, they are grouped into the second sounding group in Step S418, and sounding is performed on this second sounding group using the first channel sounding frequency in Step S420.

After Step S407, if there are any remaining static UE in the list of static UE that have not been grouped, Steps S416 to S422 may similarly be executed, including determining whether these remaining static UE's can be grouped into the second sounding group with a UE outside of the list of static UE. If they can be grouped into the second sounding group, the first channel sounding frequency is used on the second sounding group comprising the remaining static UE; if they cannot be grouped into the second sounding group, the second channel sounding frequency is used on these remaining static UE.

It can be seen from the above that the first sounding group is a sounding group completely comprising UE in the list of static UE, while the second sounding group is a sounding group comprising UE in the list of static UE and UE outside of the list of static UE. The lower second channel sounding frequency is used for the first sounding group, while the higher first channel sounding frequency is used for the second sounding group. If there are static UE that cannot be grouped with any other UE, the lower second channel sounding frequency can also be used for these static UE's.

In addition, after the list of static UE is updated in Step 404, whether the list of static UE still has any static UE can first be confirmed in Step S412. If there are static UE, Step S405 shall be executed; otherwise, according to the text above, channel sounding is performed on all UE at the first channel sounding frequency in Step S414.

Figure 5:
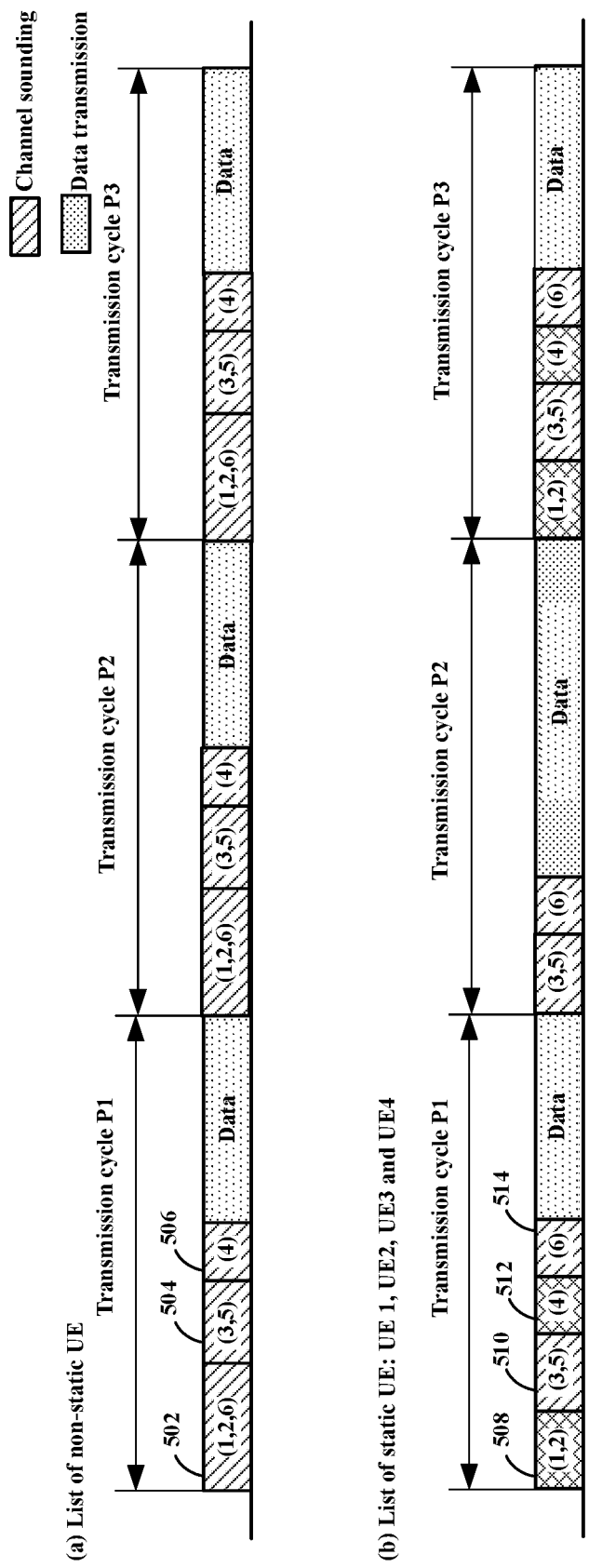
FIG. 5 is a schematic diagram showing channel sounding according to an embodiment of the present disclosure.

Next, the schematic diagram of channel sounding according to an embodiment of the present disclosure is described with reference to FIG. 5. FIG. 5 describes the wireless network system comprising the network access device and UE 1 to UE 6 according to FIG. 1, in which (a) is the execution of channel sounding in the absence of the list of static UE, and (b) is the execution of channel sounding in the presence of the list of static UE, for example, comprising UE 1 to UE 4.

The communication between the network access device and UE is based on the transmission cycle. The horizontal axis in FIGS. 5(a) and 5(b) is time, showing transmission cycles P1 to P3. Each transmission cycle comprises the starting channel sounding time period and subsequent data transmission time periods.

In FIG. 5(a), UE 1 to UE 6 are grouped into a plurality of sounding groups according to the sounding grouping criteria in the text above, in which, UE 1, UE 2 and UE 6 are grouped into one group, UE 3 and UE 5 are grouped into another group, and UE 4 is in a group on its own. In the channel sounding time period 502 in transmission cycle P1, the network access device simultaneously performs channel sounding on UE 1, UE 2 and UE 6. In the channel sounding time period 504, the network access device simultaneously performs channel sounding on UE 3 and UE 5. In the channel sounding time period 504, the network access device performs channel sounding on UE 4. Subsequent transmission cycles P2 and P3 repeat this channel sounding protocol. For UE 1 to UE 6, the channel sounding frequency of each UE is equivalent to the inverse of the duration of the transmission cycle.

In FIG. 5(b), the method of updating the list of static UE according to the text above identifies UE 1 to UE 4 as static UE and adds them to the list of static UE. The formation and updating of the list of static UE will affect the division of the sounding group because according to the present disclosure, priority is given to sounding groups formed in the list of static UE. As shown by the channel sounding time period 508 in FIG. 5(b), UE 1 and UE 2 are grouped into one group, and UE 6 is no longer included in this group. Even if UE 6 meets the sounding grouping criteria to be grouped into the same sounding group as UE 1 and UE 2, the division is not performed this way according to the embodiments of the present disclosure because the method of the present disclosure gives priority to sounding groups formed in the list of static UE. Where UE 1 and UE 2 can be assigned to the same sounding group, only whether other UE in the list of static UE may also be grouped into this sounding group is considered. If there are no more static UE to be grouped into this sounding group, grouping will end and UE outside of the list will not be considered. If UE 6 cannot be grouped into the same sounding group as any ungrouped UE in the list of static UE or UE outside of the list, it will form a sounding group on its own, as shown in channel sounding time period 514. The sounding grouping method is assumed to be kept consistent with that in FIG. 5(a) for UE 3 to 5, as shown in channel sounding time periods 510 and 512.

As the members of the sounding group formed by UE 1 and UE 2 are static UE, a channel sounding frequency lower than that in FIG. 5(a) can be used. Although the sounding group formed by static UE 4 on its own cannot form a sounding group with other static UE, a channel sounding frequency lower than that in FIG. 5(a) can also be used thereon. As shown in FIG. 5(b), transmission cycle P2 does not comprise the channel sounding time periods of UE 1, UE 2 and UE 4, while transmission cycle P3 comprises the channel sounding time period of UE 1, UE 2 and UE 4, so the channel sounding frequency for UE 1, UE 2 and UE 4 is reduced by half from the channel sounding frequency in FIG. 5(a). In transmission cycle P2, the CSI obtained in transmission cycle P1 can be used for UE 1, UE 2 and UE 4, as the channel state of UE 1, UE 2 and UE 4 has been determined to have relatively small changes with time. Although FIG. 5(b) shows that the channel sounding frequency of UE 4 is reduced, in other embodiments, the channel sounding frequency of UE 4 can also be maintained consistent with that in FIG. 5(a).

As the sounding group comprising UE 3 and UE 5 comprises UE in the list of static UE and UE outside of the list, it is not suitable for the channel sounding frequency to be reduced, so the same channel sounding frequency as that in FIG. 5(a) is used. UE 6 is not in the list of static UE, so regardless of whether it can be grouped with other UE outside of the list of static UE, its channel sounding frequency will not be reduced, so the same channel sounding as that in FIG. 5(a) is used.

It should be realized that the number of transmission cycles, number of UE, composition of the list of static UE, and duration of the channel sounding time period and data transmission time period in FIG. 5 are only exemplary and there may be other different configurations according to the embodiments of the present disclosure. Reducing the channel sounding frequency of UE 1, UE 2 and UE 4 by half of the original is also only exemplary, and the channel sounding frequency of these UE may be reduced to any value lower than the channel sounding frequency in FIG. 5(a) according to the embodiments of the present disclosure.

It can be seen that giving priority to sounding grouping of static UE (for example, having UE 1 and UE 2 comprise a sounding group) and reducing the channel sounding frequency of this sounding group can save airtime overhead occupied by channel sounding, leaving more time resources for data transmission and increasing the throughput of the system. Furthermore, reducing the channel sounding frequency of static UE that are not grouped with non-static UE can further save airtime overhead for channel sounding. Furthermore, not reducing the channel sounding frequency of the group comprising static UE and non-static UE can ensure that timely and accurate channel state information of non-static UE is obtained, while fully utilizing the capability of the network access device to simultaneously perform channel sounding on a plurality of UE.

The present disclosure may be implemented as any combination of devices, systems, integrated circuits, and computer programs on non-transitory computer-readable media. One or more processors may be enabled as an Integrated Circuit (IC), an Application Specific Integrated Circuit (ASIC) or a Large-scale Integrated Circuit (LSI), a system LSI, a super LSI, or an ultra LSI component that performs part or all of the functions described in the present disclosure.

The present disclosure includes the use of software, applications, computer programs, or algorithms. Software, application programs, computer programs or algorithms can be stored on a non-transient computer-readable medium, so that a computer with one or more processors can execute the aforementioned steps and the steps described in the attached drawings. For example, one or more memories store software or algorithms by executable instructions, and one or more processors can associate a set of instructions executing these software or algorithms to provide a method for the network access device to perform channel sounding according to the embodiments described in the present disclosure.

Software and computer programs (also called programs, software applications, applications, components, or codes) include machine instructions for programmable processors, and may be realized in high-level procedural languages, object-oriented programming languages, functional programming languages, logic programming languages, or assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLDs), including computer-readable media that receive machine instructions as computer-readable signals.

For example, the computer-readable medium may include the dynamic random access memory (DRAM), random access memory (RAM), read only memory (ROM), electrically erasable read only memory (EEPROM), compact disk read only memory (CD-ROM) or other optical disk storage devices, magnetic disk storage devices or other magnetic storage devices, or any other medium that can be used to carry or store the required computer-readable program codes in the form of instructions or data structures and can be accessed by a general or special computer or a general or special processor. As used herein, magnetic disks or disks include compact discs (CDs), laser disks, optical disks, digital versatile discs (DVDs), floppy disks, and Blu-ray disks, wherein magnetic disks usually copy data magnetically, and disks copy data optically via laser. Combinations of the above are also included in the scope of computer-readable media.

In addition, the above description provides examples without limiting the scope, applicability, or configuration set forth in the claims. Without departing from the spirit and scope of the present disclosure, changes may be made to the functions and layouts of the discussed components. Various embodiments may omit, substitute, or add various processes or components as appropriate. For example, features described with respect to some embodiments may be combined in other embodiments.

The invention claimed is:

1. A network access device, the network access device comprising:
    a memory having one or more instructions stored thereon; and
    a processor, configured to execute the instructions stored in the memory to cause the network access device to:
        monitor changes in channel state between each user equipment of a plurality of user equipment and the network access device;
        store and update a list of static user equipment, the list of static user equipment comprises one or more of the user equipment of the plurality of user equipment identified based on the monitored changes in the channel state during a first time period being smaller than a first threshold;
        group two or more user equipment from the list of static user equipment into at least one first sounding group based on sounding grouping criteria; and
    perform channel sounding on user equipment in the at least one first sounding group at a second channel sounding frequency lower than a first channel sounding frequency at which channel sounding on the plurality of user equipment is performed in the absence of the list of static user equipment.

2. The network access device according to claim 1, in which the operation of monitoring changes in the channel state between each user equipment and the network access device comprises:
    monitoring changes in the location of each user equipment.

3. The network access device according to claim 1, in which the operation of monitoring changes in the channel state between each user equipment and the network access device comprises:
    monitoring fluctuations in the Received Signal Strength Indication (RSSI) of signals received from each user equipment.

4. The network access device according to claim 1, in which the operation of updating the list of static user equipment comprises:
    adding the first user equipment to the list of static user equipment in response to the first user equipment among a plurality of user equipment being determined to have changes in the channel state between the first user equipment and the network access device smaller than the first threshold during the first time period.

5. The network access device according to claim 4, in which the operation of updating the list of static user equipment comprises:
    moving the second user equipment out of the list of static user equipment in response to the second user equipment among a plurality of user equipment being determined to have changes in channel state between the second user equipment and the network access device no smaller than the second threshold during the second time period, in which the second threshold is no lower than the first threshold.

6. The network access device according to claim 1, in which the sounding grouping criteria comprises a requirement that user equipment grouped into the same sounding group must meet at least one of the following:
    same operating bandwidth;
    same RSSI; and
    sufficient angular separation.

7. The network access device according to claim 1, in which the processor is further configured to execute the instructions stored on the memory to further cause the network access device to:
    perform channel sounding on a plurality of user equipment that are not in the list of static user equipment at the first channel sounding frequency.

8. The network access device according to claim 1, in which the processor is further configured to execute the instructions stored on the memory to further cause the network access device to:
perform channel sounding on user equipment in the list of static user equipment that are not in the at least one first sounding group at the second channel sounding frequency.

9. The network access device according to claim 1, in which the processor is further configured to execute the instructions stored on the memory to further cause the network access device to:
perform channel sounding on the second sounding group at the first channel sounding frequency, in response to the determination that a user equipment in the list of static user equipment cannot be grouped into the same sounding group as any other user equipment in the list of static user equipment based on the sounding grouping criteria, but can be grouped into a second sounding group with a user equipment among the plurality of user equipment that are not in the list of static user equipment.

10. A method for a network access device, comprising:
monitoring changes in channel state between each user equipment of a plurality of user equipment and the network access device;
storing and updating a list of static user equipment, the list of static user equipment comprises one or more of the user equipment of the plurality of user equipment identified based on the monitored changes in channel state during a first time period being smaller than a first threshold;
grouping two or more user equipment in the list of static user equipment into at least one first sounding group based on sounding grouping criteria; and
performing channel sounding on user equipment in the at least one first sounding group at a second channel sounding frequency lower than a first channel sounding frequency at which channel sounding on the plurality of user equipment is performed in the absence of the list of static user equipment.

11. The method according to claim 10, in which the operation of monitoring changes in the channel state between each user equipment and the network access device comprises:
monitoring fluctuations in the Received Signal Strength Indication (RSSI) of signals received from each user equipment.

12. The method according to claim 10, in which updating the list of static user equipment comprises:
adding the first user equipment to the list of static user equipment in response to the first user equipment among a plurality of user equipment being determined to have changes in the channel state between the first user equipment and the network access device smaller than the first threshold during the first time period.

13. The method according to claim 12, in which updating the list of static user equipment comprises:
moving the second user equipment out of the list of static user equipment in response to the second user equipment among a plurality of user equipment being determined to have changes in channel state between the second user equipment and the network access device no smaller than the second threshold during the second time period, in which the second threshold is no lower than the first threshold.

14. The method according to claim 10, in which the sounding grouping criteria comprises a requirement that user equipment grouped into the same sounding group must meet at least one of the following:
same operating bandwidth;
same RSSI; and
sufficient angular separation.

15. The method according to claim 10, further comprising:
performing channel sounding on user equipment in the list of static user equipment that are not in the at least one first sounding group at the second channel sounding frequency.

16. The method according to claim 10, further comprising:
performing channel sounding on the second sounding group at the first channel sounding frequency, in response to the determination that a user equipment in the list of static user equipment cannot be grouped into the same sounding group as any other user equipment in the list of static user equipment based on the sounding grouping criteria, but can be grouped into a second sounding group with a user equipment among the plurality of user equipment that are not in the list of static user equipment.

17. A non-transitory computer-readable medium of a network access device, the non-transitory computer-readable medium having instructions stored therein, the instructions when executed by a processor of the network access device cause the network device to perform one or more operations comprising:
monitoring changes in channel state between each user equipment of a plurality of user equipment and the network access device;
storing and updating a list of static user equipment, the list of static user equipment comprises one or more of the user equipment, of the plurality of user equipment identified based on the monitored changes in channel state during a first time period being smaller than a first threshold;
grouping two or more user equipment in the list of static user equipment into at least one first sounding group based on sounding grouping criteria; and
performing channel sounding on user equipment in the at least one first sounding group at a second channel sounding frequency lower than the first channel sounding frequency at which channel sounding on the plurality of user equipment is performed in the absence of the list of static user equipment.

18. The non-transitory computer-readable medium according to claim 17, in which the operation of monitoring changes in the channel state between each user equipment and the network access device comprises:
monitoring fluctuations in the Received Signal Strength Indication (RSSI) of signals received from each user equipment.

19. The non-transitory computer-readable medium according to claim 17, in which the operation of updating the list of static user equipment comprises:
moving the second user equipment out of the list of static user equipment in response to the second user equipment among a plurality of user equipment being determined to have changes in channel state between the second user equipment and the network access device no smaller than the second threshold during the second time period, in which the second threshold is no lower than the first threshold.

\* \* \* \* \*